(12) United States Patent
Szczesniak et al.

(10) Patent No.: US 11,349,937 B2
(45) Date of Patent: May 31, 2022

(54) PASSIVE MANAGEMENT OF NETWORK CONNECTIONS

(71) Applicant: EMC IP Holding Company LLC, Hopkinton, MA (US)

(72) Inventors: Rafal Szczesniak, Toronto (CA); Jeremy Hitt, Amherst, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/026,127

(22) Filed: Sep. 18, 2020

(65) Prior Publication Data

US 2022/0094751 A1 Mar. 24, 2022

(51) Int. Cl.
    G06F 15/16 (2006.01)
    H04L 67/148 (2022.01)
    H04L 67/145 (2022.01)
(52) U.S. Cl.
    CPC .......... H04L 67/148 (2013.01); H04L 67/145 (2013.01)
(58) Field of Classification Search
    CPC ... H04L 67/145; H04L 67/146; H04L 67/148; H04L 67/14
    USPC .................................. 709/202–203, 227–228
    See application file for complete search history.

(56) References Cited

U.S. PATENT DOCUMENTS

| | | | |
|---|---|---|---|
| 10,182,126 B2 * | 1/2019 | Johnsimon | H04L 67/2814 |
| 10,331,599 B2 * | 6/2019 | Sonar | H04L 67/141 |
| 10,581,796 B2 * | 3/2020 | Aluvala | H04L 43/10 |
| 10,721,310 B2 * | 7/2020 | Huang | H04L 67/148 |
| 10,999,379 B1 * | 5/2021 | Galrani | H04L 67/145 |
| 2007/0112911 A1 * | 5/2007 | McKeeth | H04L 29/12301 709/203 |
| 2010/0268939 A1 * | 10/2010 | Pahlavan | H04L 67/148 709/227 |
| 2010/0274848 A1 * | 10/2010 | Altmaier | H04L 67/14 709/228 |
| 2013/0067095 A1 * | 3/2013 | Kruse | H04L 67/148 709/227 |
| 2016/0100016 A1 * | 4/2016 | Mu | H04L 67/146 709/219 |
| 2017/0085556 A1 * | 3/2017 | Mathew | H04L 67/141 |
| 2017/0315833 A1 * | 11/2017 | Vajravel | G06F 3/0619 |

* cited by examiner

*Primary Examiner* — Bharat Barot
(74) *Attorney, Agent, or Firm* — Amin, Turocy & Watson, LLP

(57) ABSTRACT

Techniques are provided for passive management of network connections. In an example, a cluster node determines to migrate its client connections to other nodes of its cluster. The cluster node can determine whether a client implements an always resolving policy (regarding resolving a domain name of the cluster), a cache resolving policy, or a resolve once policy. Where the node disconnects a client and it does not reconnect (because a domain name service (DNS) server no longer resolves a domain name to the node), the client implements an always resolving policy. Where the node eventually stops reconnecting, the client implements a cache resolving policy. After nodes of those types are migrated, nodes that implement a resolve once policy. The node can migrate these clients by disconnecting them in coordinating with stopping accepting connections. This can lead to non-disruptive migration of all clients.

20 Claims, 12 Drawing Sheets

PASSIVE MANAGEMENT OF NETWORK CONNECTIONS

TECHNICAL FIELD

The present application relates generally to migrating client network connections (which can sometimes be referred to as sessions) between nodes of a cluster of computing nodes.

BACKGROUND

There can be different versions of a given network communications protocol, which implement aspects of a network communications protocol differently, or that implement different features relative to other versions of a given network communications protocol. Take for example a server message block (SMB) protocol. There can be multiple versions of a SMB protocol, including SMB version 1, (SMB1, or SMBv1), SMB version 2 (SMB2 or SMBv2), and SMB version 3 (SMB3, or SMBv3). A difference between these versions of a SMB protocol can be that a SMB2 protocol can be more secure than a SMB1 protocol.

There can be clusters of computing nodes where multiple nodes serve client connections according to a particular network communications protocol, such as a SMB2 protocol.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
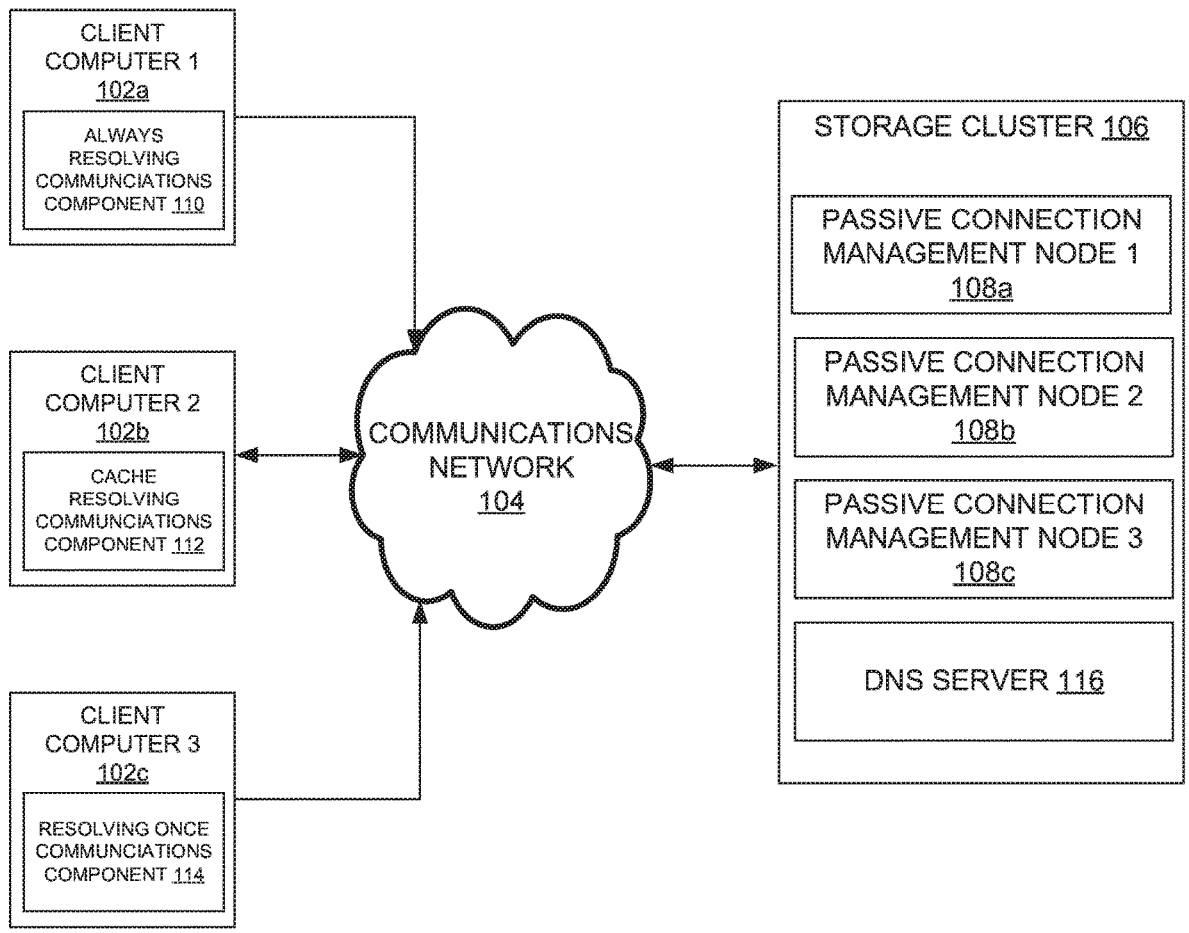
FIG. 1 illustrates an example system architecture that can facilitate passive management of network connections, in accordance with certain embodiments of this disclosure.

Examples of techniques described here generally involve SMB2 connections. It can be appreciated that these techniques can be applied to other types of network connections, including other network communications protocols that implement similar features as a SMB2 network communications protocol.

Additionally, examples of techniques described herein generally involve computer clusters. A computer cluster can generally comprise multiple computers (that can be referred to as nodes) that work in concert and can logically be considered to be a single computer system. Where a computer cluster provides computer storage services, it can be referred to as a storage cluster. It can be appreciated that the present techniques can be applied to other system architectures.

With a highly available scale-out storage cluster, there can be times when there is a desire to take a cluster node offline, such as to perform maintenance, like installing software updates. Taking a cluster node offline can result in restarting the cluster node. Restarting a cluster node can cause disruption for a client that is connected to the cluster node, and also reduce an overall cluster availability. Given these considerations, techniques can be implemented to reduce a number of client connections to a cluster node before taking that cluster node offline.

The present techniques can facilitate moving client connections off of a cluster node non-disruptively due to a client's ability to recreate its connection state after a sudden connection loss. A cluster node that is non-disruptively moving client connections off of it can be referred to as a "drained node," and its internet protocol (IP) address(es) can be referred to as "drained IP address(es)." Then, an approach to move client connections off of a cluster node can be referred to "draining." In this context, "non-disruptive" can indicate that an end user for the client connection is not alerted or prompted by a remote connection program of the client about the client connection being moved between nodes. Since the client is not alerted or prompted by a non-disruptive move of the corresponding client connection, then in some examples, the end user does not notice that a reconnection to another cluster node occurs.

In some examples, this type of approach can involve a cluster being configured with a network domain name (sometimes referred to as a domain name, a fully qualified domain name (FQDN), or a uniform resources locator (URL), and can involve a client using the storage cluster's domain name when connecting to the cluster).

In some examples, a client can communicate with a DNS server, and send the DNS server a domain name of, which the DNS server will resolve to an IP address of that it sends to the client. The DNS server can implement load balancing by resolving the domain name of to one of multiple IP addresses for, and varying which of these multiple IP addresses it returns to the client.

In some examples, once a cluster node becomes a drained node, which has drained IP addresses, the DNS server can stop responding to client requests with one or all of those drained IP addresses. By doing that, the DNS server will not direct new connections to a cluster node that is in the process of draining itself of connections so that maintenance can be performed on that cluster node.

Then, existing connections of a drained node can generally be categorized as one of two things: well-established or new. In some examples, clients that have either a well-established connection or a new connection can attempt to optimize for performance—which can be permitted by a SMB2 network communications protocol. One way that clients can optimize for performance can involve employing client-side caching mechanisms. Some client-side caching mechanisms can be referred to as "oplocks" or "leases." With an oplock (sometimes referred to as an opportunistic lock), a client can lease a file on a server, and the client caches that file locally, where it can modify it without communicating with the server while the oplock is in place. In some examples (such as in a SMB2.1 protocol), a lease is a type of oplock where a client obtains and preserves a client-caching state across multiple file open calls that it can originate.

An approach taken in client-side caching mechanisms can be to postpone read or write operations from the client to the server, and keep caching the data on the client side so long as no other client is trying to access that data via the server.

In some approaches for draining a cluster node, caching can be ended because it can pose a risk of data loss when a cluster node disconnects a client connection. An approach to end caching by clients can be for a cluster node to revoke guarantees for well-established connections. In a SMB2 communications protocol, and with a well-established connection, revoking guarantees can involve sending an oplock break or a lease break to a client, and waiting for the client to flush its cache, and then confirm its readiness to the cluster node. Another way that revoking guarantees can be implemented for a new connection can be to deny granting caching to a client that requests it. This approach can be valid under a SMB2 communications protocol.

When a client stops caching (or is not allowed to begin caching at all), a cluster node can drop that client connection after elements of a SMB2 protocol layer have been established. These elements of a SMB2 protocol layer can include that a user has authenticated, that the client has connected to a desired end point (which can be a file share in a SMB2 communications protocol), and that a first few files have been opened, which can be subject to a timeout condition.

In examples that involve waiting to drop a client connection after elements of a SMB2 protocol layer have been established, the present techniques can leverage a feature of some client implementations where clients are designed to rebuild an entire connection state, after it has been successfully built in the first place, and then lost due to an interim failure at a transport layer. In such examples, a client can interpret a dropped connection after fully establishing a connection as not being due to the server, and can non-disruptively work to reestablish a connection with the cluster. A type of client disconnection where the client is disconnected after elements of a SMB2 protocol layer have been established can be referred to as a "sustained disconnection."

In contrast, and in some examples, where a client is disconnected before elements of a SMB2 protocol layer have been established, some client implementations can categorize the situation as an overall problem with the storage cluster or its connection, and so alert the user. This alert can eliminate a non-disruptive experience involved with transitioning client connections between cluster nodes of a cluster.

In some examples, a client implementation can be implemented as one of the following types. One example of a client implementation is an "always resolving" implementation (where a corresponding client can be referred to as an "always resolving client"). In an always resolving implementation, a client can resolve a domain name of the storage cluster each time the client connects to the storage cluster.

Another example of a client implementation is a "cache resolving" implementation (where a corresponding client can be referred to as a "cache resolving client"). With a cache resolving client, a client can resolve and cache (subject to a timeout period) a DNS result for a domain name of the storage cluster for connecting, and for any reconnecting.

Another example of a client implementation is a "resolve once" implementation (where a corresponding client can be referred to as a "resolve once client"). In a resolve once implementation, a client can resolve and keep (without a timeout) a DNS result for a domain name of the storage cluster for connecting, and for any reconnecting.

An always resolving client can be encountered when a single sustained disconnection can cause it to resolve the domain name of the storage cluster again, and then—because the DNS server issues it a new IP address for the storage cluster—connect to a new storage node. An always resolving client can stop trying to connect to the drained node, which can aid the drained node in ending its connections non-disruptively. In a drained node, always resolving clients can be a first group of clients that are migrated away from a drained node, and to a different node of the storage cluster.

A drained node can identify a client with a caching resolving implementation when that client takes several sustained disconnections for its cache timeout period to elapse. At that point, the client with a caching resolving implementation can resolve the domain name again with a DNS server, which will return a new IP address to the client. That client can then connect to a different node of the storage cluster than the drained node to which it was previously connected. In a drained node, cache resolving clients can be a second group of clients that are migrated away from a drained node (after the always resolving clients), and to a different node of the storage cluster.

Cache resolving clients can be pre-categorized (e.g., before a cluster node transitions to become a drained node) by tracking timestamps of their connection attempts that closely follow their sustained disconnections.

A resolve once client can be a client that has first been considered a cache resolving client—only the client has not stopped connecting after a configurable timeout (e.g., it becomes apparent that the client does not have a timeout period, after which it will again resolve the domain name for the storage cluster with a DNS server).

A resolve once client can be disconnected by coordinating a sustained disconnection along with the drained node stopping accepting new connections, so any new connection attempts by the resolve once client are rejected at the transport layer.

Such a client can then resolve the domain name again and try to connect to another cluster node (the cluster node indicated by an IP address returned by a DNS server). In another example, such a client can then prompt a user, which can be considered disruptive, rather than non-disruptive. In some examples, a resolve once client can allow a user to ignore the disconnection, and the client can restart the connection in response to the user attempting to access data on the drained node again, given that it is considered a new connection.

The present techniques can apply these stages of disconnecting clients in turn—always resolving clients, then cache resolving clients, leaving just the resolve once clients. When resolve once clients are the only clients left that are connected to a drained node, the drained node can disconnect those clients as well as stop listening for new connections, so that the resolve once clients cannot reconnect to the drained node, and eventually reconnect to a different storage node of the storage cluster.

Some prior approaches to SMB2 connections lack support for this kind of functionality, for instance, because a SMB2 protocol lacks a specification of mechanisms to facilitate clustered storage scenarios.

In some examples, a client can have multiple concurrent connections with a node, and these multiple concurrent connections can be referred to as a session. In such examples, disconnecting a client connection can indicate disconnecting each of the multiple connections of the client's session.

Example Architecture

FIG. 1 illustrates an example system architecture 100 that can facilitate passive management of network connections, in accordance with certain embodiments of this disclosure. As depicted, system architecture 100 comprises client computer 1 102a, client computer 2 102b, client computer 3 102c, communications network 104, storage cluster 106, and domain name system (DNS) server 116. In turn, client computer 1 102a comprises always resolving communications component 110; client computer 2 102b comprises cache resolving communications component 110; and client computer 3 102c comprises resolve once communications component 110.

Always resolving communications component 110 can effectuate network communications with an always resolving implementation, as described herein. Cache resolving communications component 112 can effectuate network communications with an always resolving implementation, as described herein. Resolve once communications component 114 can effectuate network communications with an always resolving implementation, as described herein.

Storage cluster 106 comprises passive connection management node 1 108a, passive connection management node 2 108a, and passive connection management node 3 108c.

Figure 12:
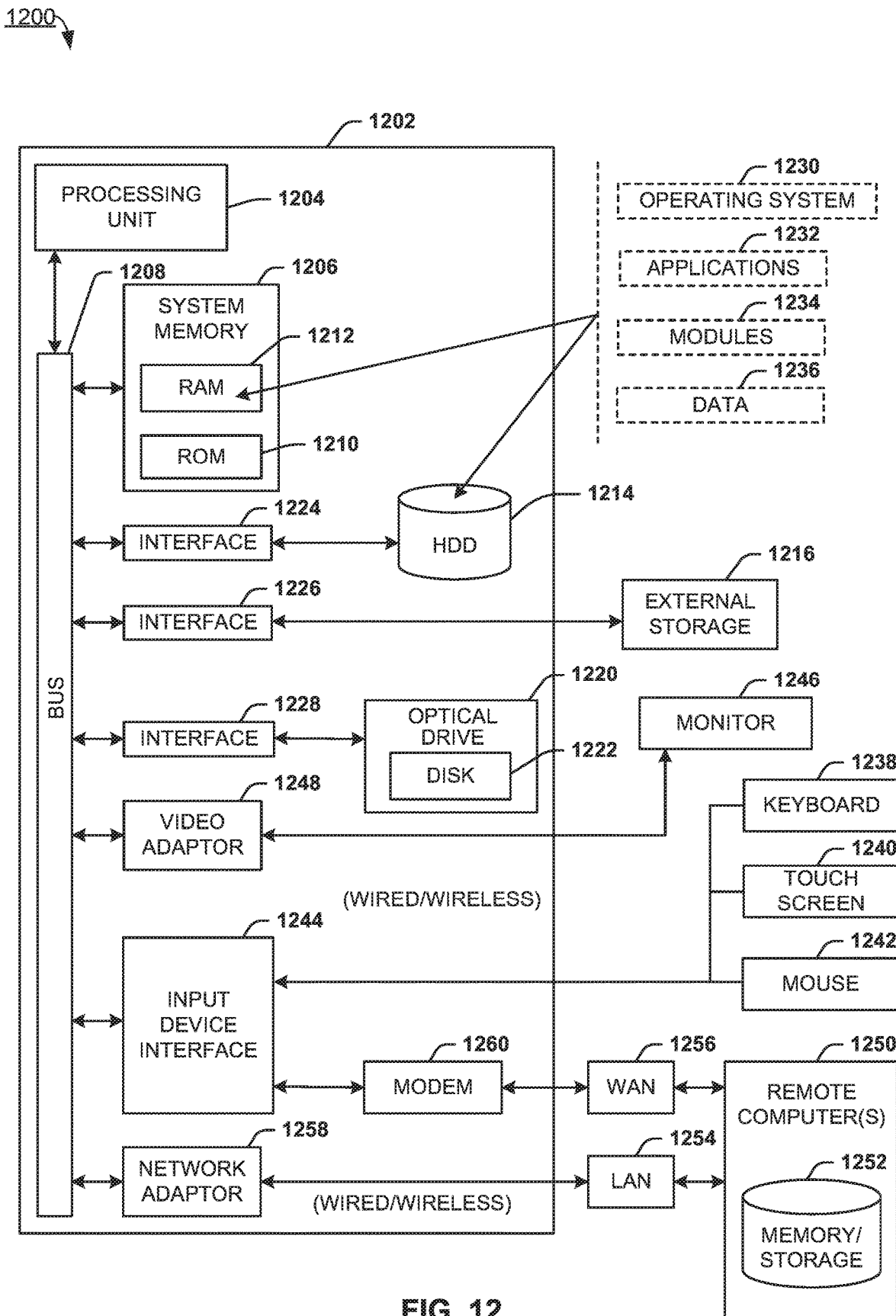
FIG. 12 illustrates an example block diagram of a computer operable to execute certain embodiments of this disclosure.

Each of client computer 1 102a, client computer 2 102b, client computer 3 102c, storage cluster 106, passive connection management node 1 108a, passive connection management node 2 108b, passive connection management node 3 108c, and DNS server 116 can be implemented with aspects of one or more instances of computer 1202 of FIG. 12. Communications network 104 can comprise a computer communications network, such as the INTERNET, or an isolated private computer communications network.

Each of client computer 1 102a, client computer 2 102b, and client computer 3 102c can establish communications with storage cluster 106 to access storage resources of storage cluster 106. For example, client computer 1 102a can send communications across communications network 104 to DNS server 116 to resolve a domain name of storage cluster 106, and receive an IP address for one of passive connection management node 1 108a, passive connection management node 2 108b, and passive connection management node 3 108a in return. In this example, let DNS server 116 return an IP address for passive connection management node 1 108a to client computer 1 102a.

Client computer 1 102a can then establish communications with passive connection management node 1 108a via communications network 104, and by using the IP address for passive connection management node 1 108a. This communication between client computer 1 102a and passive connection management node 1 108a can be made according to a communication protocol, such as a SMB2 protocol.

After the connection between client computer 1 102a and passive connection management node 1 108a has been established, then passive connection management node 1 108a can determine to drain its connections so that maintenance can be performed on it. In the course of draining its connections, passive connection management node 1 108a can migrate its connections to passive connection management node 2 108b and/or passive connection management node 3 108c. In doing so, passive connection management node 1 108a can facilitate passive management of network connections by implementing aspects of one or more of the process flows of FIGS. 2-11.

Example Process Flows

Figure 2:
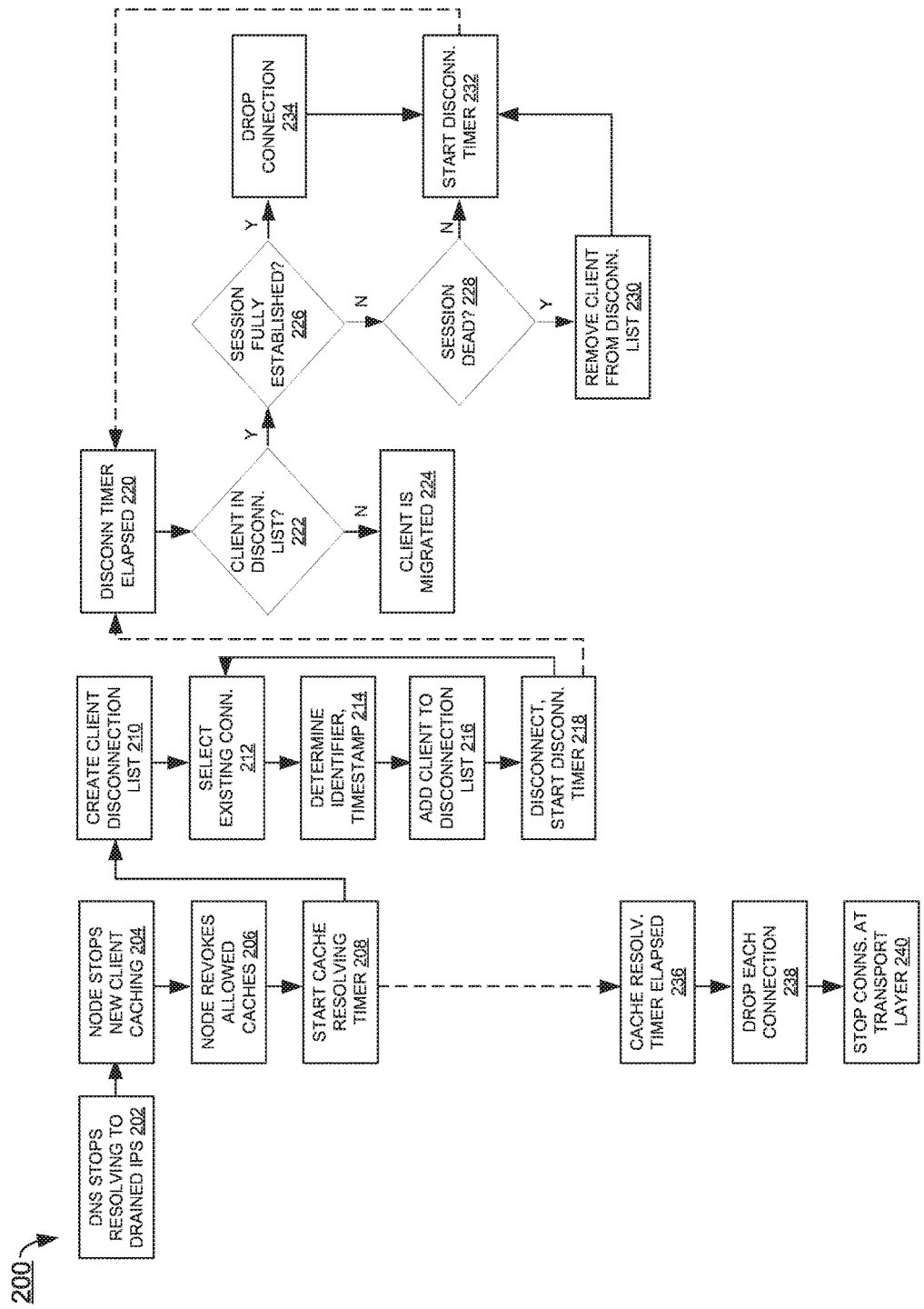
FIG. 2 illustrates an example process flow that can facilitate passive management of network connections, in accordance with certain embodiments of this disclosure.

FIG. 2 illustrates a process flow 200 that can facilitate passive management of network connections, in accordance with certain embodiments of this disclosure. In some examples, aspects of process flow 200 can be implemented by passive connection management node 1 108a of FIG. 1 as it communicates with one or more of client computer 1 102a, client computer 2 102b, or client computer 3 102c, as well as DNS server 116. In some examples, aspects of process flow 200 can be implemented by computing environment 1200 of FIG. 12. It can be appreciated that process flow 200 can be implemented with multiple threads of execution operating concurrently. For example, a separate thread can process each client reconnection in operations 220-234, while another thread monitors the cache resolving timer in operation 208 (and when that expires, process flow 200 can move to operation 236).

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with aspects of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 200 begins with operation 202. Operation 202 depicts a DNS stopping resolving a domain name of the cluster to drained IPs. Using the example of system architecture 100 of FIG. 1, here the DNS can be DNS server 116. DNS server 116 can be a node of storage cluster 106 that is configured to provide DNS services for this cluster.

Another node of storage cluster 106, such as passive connection management node 1 106a, can publish a notification to a service of storage cluster, where the notification indicates that the node is switching to a drained state. DNS server 106 can subscribe to this service, and so receive the notification from passive connection management node 1 106*a*. After operation 202, process flow 200 moves to operation 204.

Operation 204 depicts a node stopping allowing client caching. In an example, stopping allowing client caching can comprise the node refusing all new requests from clients for new caches. That is, the node stops granting any more oplocks or leases to clients. After operation 204, process flow 200 moves to operation 206.

Operation 206 depicts the node revoking all allowed client caches. In some examples, a client has a cache by acquiring an oplock or a lease. This cache can comprise the client locally storing a copy of a resource provided by storage cluster 106, such as a file of a file system, and modifying this resource locally, without transmitting these local modifications back to storage cluster 106 each time the client makes a modification.

There can be a mechanism where, when another client wants access to that same resource, the node can send an indication to the client indicating that another client has requested access to the resource. In response, the client returns modifications of the resource to the node, and confirms it no longer has the corresponding oplock or lease.

In operation 206, the node can send such an indication to the client. In some examples, this indication conveys that the server previously promised the client that another entity was not going to touch the resource in question, and can no longer keep that promise. This indication can be a mechanism used by the node to revoke pre-existing caches so that the node can migrate clients to other nodes of storage cluster without risking the loss of changes that the client might have cached 106.

In some examples, the node can either wait for the client to respond that it has returned cached resources (or has not modified the resources it cached), or can wait until the expiration of a timer it starts running as part of operation 206. If the timer expires before the client responds that it has returned cached resources, the node can proceed as though the client cache permission has been revoked. After operation 206, process flow 200 moves to operation 208.

Operation 208 depicts starting a cache resolving timer. This timer can be a timer maintained by the node that is draining. It can measure an amount of time to attempt to get connected clients to migrate to another node of storage cluster 106, because those clients are either resolve always clients or cache resolving clients. At the expiration of the cache resolving timer, the drained node can treat any remaining clients as resolve once clients.

In some examples, clients can implement different approaches to being disconnected—e g., resolve always, cache resolving, or resolve once, as described herein. And it can be that this client implementation is not communicated to the node that the client connects to, such as during establishing the communication. So, in some examples, the node does not know what type of implementation a particular client uses. Where the node does not know what type of implementation a particular client uses, the node may attempt to determine this through the present techniques.

While the node could force all clients to migrate by treating them like resolve once clients, the node can attempt to get other clients (e.g., resolve always clients and cache resolving clients) to migrate through less harsh techniques than are reserved for the resolve once clients. A reason for this can be that in some examples, there can be a possibility that a technique used to migrate a resolve once client will not be non-disruptive, but rather the user of the resolve once client will be informed that the client is being, or has been, reconnected to another node of storage cluster 106 or disconnected from the node of storage cluster 106.

After operation 208, process flow 200 moves to operation 210. In the process flow that moves to operations 210-218, client connections can be dropped and monitored for reconnections, so as to migrate always resolving clients and cache resolving clients. Then, when the cache resolving timer expires in operation 236, that can indicate that any remaining connections involve resolve once clients, and they can be handled accordingly.

Operation 210 depicts creating a disconnection list. In some examples, this can comprise creating an empty list of client connections that are to be disconnected. This list can be a file or other computer data structure in which the node can store information about client connections.

After operation 210, process flow 200 moves to operation 212.

Operation 212 depicts selecting an existing connection. In an example, a node can make an application programming interface (API) call that returns an enumerated list of current connections to the node. In such examples, operation 212 can comprise selecting a connection from a list of active connections that the node has not yet examined in the current instantiation of process flow 200.

After operation 212, process flow 200 moves to operation 214.

Operation 214 depicts determining an identifier and a time stamp for the connection. This can be the connection selected in operation 212, and the time stamp can be a current time. In some examples, this identifier can be a globally unique identifier (GUID) or universally unique identifier (UUID), which can comprise a number that is large enough that it will likely uniquely identify the client among all computers on the INTERNET.

The client can communicate this identifier to the node as part of establishing a communication. The node can store it, such as in a computer memory at a known location. When a client later attempts to connect to the node after the node disconnects clients, the node can compare the identifier conveyed in this new connection to determine whether this is a disconnected client attempting to reconnect, or if this is a new client attempting to connect and that has not just been disconnected. In some examples, a client can change its GUID over time, which can cause the node not to distinguish the same client between two remote connections.

After operation 214, process flow 200 moves to operation 216.

Operation 216 depicts adding an entry comprising the identifier of the client, a timestamp, and an identifier of the connection to the disconnection list. This can be information obtained in operation 212 and added to the disconnection list of operation 210.

After operation 216, process flow 200 moves to operation 218.

Operation 218 depicts dropping the connection, and starting a disconnection timer for the client of the dropped connection. In dropping the connection, the node can unilaterally disconnect the client from the communication between the node and the client. In some examples, the node can send a message to the client indicating that the client is being disconnected.

The disconnection timer can measure an amount of time to permit the client to attempt to reconnect after being disconnected, and a separate disconnection timer can be maintained for each client.

In some examples, dropping the connection (in operation 218 and elsewhere) can depend on a state of read or write activity between the client and the node. For example, the node can wait until the client has completed current read or write activity before dropping the connection. In other examples (such as when a large amount of data is being read or written), the node can disconnect the client early into undertaking a read or write, but not once a threshold amount of the read or write operation(s) have occurred. At that point, the node can then wait until the read or writes have completed to disconnect the client connection. An administrator of the node can specify what that threshold is.

Where there are more connections to be evaluated, process flow 200 can return to operation 212 to enumerate through the connections. Additionally, after operation 218, for each connection, process flow 200 can move to operation 220, subject to the disconnection timer. Operations 220-234 can be performed for each connection that is processed in operations 212-218. And where each client connection is evaluated in operations 212-218, process flow 200 can move to operations 220-230 for each client connection individually, to see if the client will migrate away before the cache resolving timer of operation 208 expires.

Operation 220 depicts determining that a disconnection timer has elapsed for a client connection. After operation 220, process flow 200 can move to operation 222.

Operation 222 depicts determining whether the client has reconnected. In some examples, this can comprise determining whether the identifier (e.g., GUID) for the previous connection has returned to the disconnection list (such as through a new client connection via process flow 300 of FIG. 3). Where that identifier is again in the disconnection list, it can be determined that the client has reconnected, and otherwise it can be determined that the client has not reconnected.

Where in operation 222 it is determined that the client has reconnected, then process flow 222 moves to operation 226. Instead, where in operation 222 it is determined that the client has not reconnected, then process flow 222 moves to operation 224.

Operation 224 is reached from operation 222 where it is determined in operation 222 that the client has not reconnected. Operation 224 depicts determining that the client has migrated. That is, where the client does not reconnect, the node can then determine that the client has instead migrated to another node of storage cluster 106. Where a goal of a drained node is to migrate clients to other nodes so that the drained node can undergo maintenance, this can be considered success for this client connection, and the drained node can stop performing further operations for that migrated client.

After operation 224 process flow 200 ends for that client connection, and can continue for other clients being migrated away from the node. Where the client never reconnects after its initial disconnection, the node can consider the client to be an always resolving client.

Operation 226 is reached from operation 222 where it is determined in operation 222 that the client has reconnected. Operation 226 depicts determining whether the client has fully established a connection.

In some examples, fully establishing a connection (which can sometimes be referred to as a fully-established session) can comprise authenticating with a login and password of the client, and giving the client access to resources of storage cluster 106. This can be distinguished from examples where a client attempts to reconnect, but the node does not go through the steps of authenticating the client. A node can determine whether the client has fully established a connection where the client has reached a point of a connection where it can access resources of the storage cluster.

In some examples, where a client fully reconnects to a node, the client will reestablish state information about the connection that the client can use to non-disruptively reconnect again should the client disconnect. And in some examples, a client implementation can consider a disconnection before fully establishing a connection to be a problem with the server, and can consider a disconnection after successfully fully establishing a connection to be a problem with a communications network to the server, such as at a transport layer. So, the node can fully establish the client connection so that the client has state information to reconnect again should the node disconnect the client again by returning to operation 212.

Where it is determined in operation 226 that the client has fully established a connection, then process flow 200 moves to operation 234. Instead, where it is determined in operation 226 that the client has not fully established a connection, then process flow 200 moves to operation 228.

Operation 228 depicts determining whether the client connection is dead. A connection can be dead from a client terminating the connection, and this can be determined by the node where there is no longer an active connection that corresponds to the client. In some examples, a client connection can be considered to be dead where the client is disconnected, and has released any cluster resources that it had acquired.

Where it is determined in operation 228 that the client connection is dead, then process flow 200 of FIG. 2 moves to operation 230. Instead, where it is determined in operation 228 that the client connection is not dead, then process flow 200 of FIG. 2 moves to operation 232.

Operation 230 is reached from operation 228 where it is determined that the client connection is dead. Operation 230 depicts removing the entry from the client from the disconnection list. A node can implement operation 230 where it determines that further efforts to migrate the client to another node of a storage cluster are not necessary, because the client connection is already dead. After operation 230, process flow 200 moves to operation 232.

Operation 232 is reached from operation 230, from operation 228 where it is determined in operation 228 that the client connection is not dead, and from operation 234. Operation 232 depicts starting another disconnection timer for the client, which can be implemented in a similar manner as operation 218. A disconnection timer can reference a current timestamp (with the disconnection timer set to run for a specified amount of time after that timestamp), an identifier of the client (e.g., the client's GUID), and an identifier of the connection.

After operation 232, process flow 200 moves to operation 220, where process flow 200 can wait until this disconnection timer expires.

Operation 234 is reached from operation 226 where it is determined in operation 226 that the client connection is fully established. Operation 234 depicts disconnecting the connection. This can be implemented in a similar manner as operation 218.

After operation 234, process flow 200 moves to operation 232.

Operation 236 is reached from operation 208. Operation 236 depicts determining that the cache resolving timer of operation 208 has expired. This cache resolving timer can measure an amount of time permitted for always resolving clients and cache resolving clients to migrate to another node. In some examples, any clients still connected to the node after the expiration of the cache resolving timer can be treated as if they are resolving once clients, which need further intervention to be migrated.

After operation 236, process flow 200 moves to operation 238. Operation 238 depicts dropping each remaining client connection. In some examples, operation 238 can be implemented in a similar manner as operations 212-218.

After operation 238, process flow 200 moves to operation 240.

Operation 240 depicts the node stop accepting connections at the transport layer. In some examples, a resolve once client will not return to DNS server 116 for a new IP address of a different node of storage cluster 106 without more significant intervention than has been attempted.

This more significant intervention can comprise the node stopping accepting new connections at the transport layer— e.g. a Transmission Control Protocol/Internet Protocol (TCP/IP) layer of a communications network. This transport layer can be distinguished from a layer of the application layer protocol (e.g., SMB2) used by the client and the node to communicate. In a layered model of network protocols, the application layer protocol layer can be said to be built on top of the transport layer.

Where the node stops accepting connections at the transport layer, the client can eventually determine that the node is no longer functional. Then, even though the client is a resolve once client, the client can still go back to DNS server 116 to query for an IP address for a domain name of storage cluster 106. Since DNS 116 is no longer responding with IP addresses of the drained node, DNS 116 can respond to the client with an IP address of a different node of storage cluster 106. The client can use this new IP address to connect to the different node, thus migrating the client from the drained node.

Where the node stops accepting connections at the transport layer, a client that attempts to connect to the node can receive an error at its system kernel layer that the connection was dropped, or that its TCP session (which can operate on a network layer below a layer that a SMB2 protocol operates on) has been disconnected.

After operation 240, process flow 200 ends.

Figure 3:
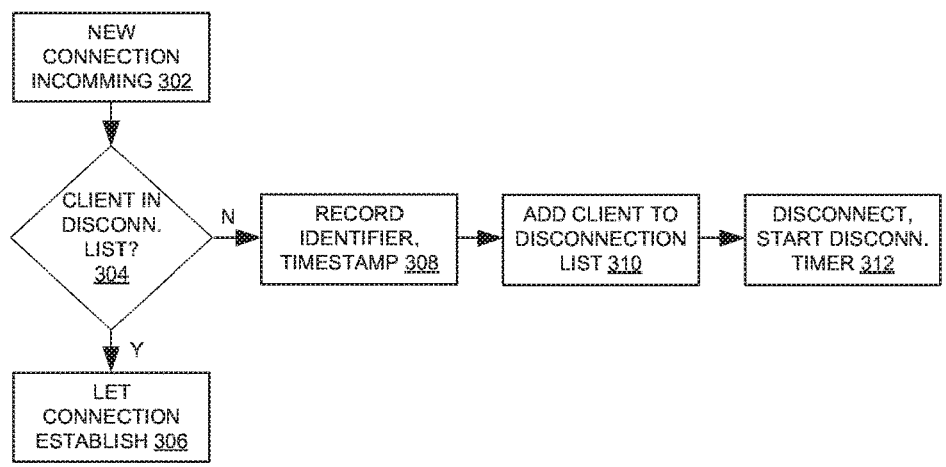
FIG. 3 illustrates an example process flow for handling incoming connections to can facilitate passive management of network connections, in accordance with certain embodiments of this disclosure.

FIG. 3 illustrates an example process flow 300 for handling incoming connections that can facilitate passive management of network connections, in accordance with certain embodiments of this disclosure. In some examples, new connections can be processed with process flow 300. Where a new connection is processed at operation 312 (where a connection is then dropped and a disconnection timer is started), then aspects of process flow 200 of FIG. 2 can be implemented to see whether the client reconnects. For example, operation 312 can flow to operation 220 of FIG. 2 (which depicts determining that the disconnection timer has elapsed).

In some examples, aspects of process flow 300 can be implemented by passive connection management node 1 108a of FIG. 1 as it communicates with one or more of client computer 1 102a, client computer 2 102b, or client computer 3 102c, as well as DNS server 116. In some examples, aspects of process flow 300 can be implemented by computing environment 1200 of FIG. 12.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 300 begins with operation 302, which depicts a new connection incoming. This can be a connection received by passive connection management node 1 108a of FIG. 1 from one of client computer 1 102a, client computer 2 102b, and client computer 3 102c. After operation 302, process flow 300 moves to operation 304.

Operation 304 depicts determining whether an identifier for the new connection is in a list of client connections being disconnected. In some examples, when a client attempts to establish a connection, the client provides an identifier (such as a GUID) to the node. The node can compare this client-provided identifier with the disconnection list of operations 210 and 216 of FIG. 2, or operation 310.

Where it is determined in operation 304 that the identifier for the new connection is in a list of client connections being disconnected, then process flow 300 moves to operation 306. Instead, where it is determined in operation 306 that the identifier for the new connection is not in a list of client connections being disconnected, then process flow 300 moves to operation 308.

Operation 306 is reached from operation 304 where it is determined in operation 304 that the identifier for the new connection is in a list of client connections being disconnected. Operation 306 depicts establishing the connection. In some examples, operation 306 can be implemented in a similar manner as operation 226 of FIG. 2. After operation 306, process flow 300 ends.

Operation 308 is reached from operation 304 where it is determined in operation 304 that the identifier for the new connection is not in a list of client connections being disconnected. Operation 308 depicts recording the identifier for the new connection and a time stamp. In some examples, operation 308 can be implemented in a similar manner as operation 214 of FIG. 2. After operation 308, process flow 300 moves to operation 310.

Operation 310 depicts adding the identifier for the new connection and the time stamp to the list of client connections being disconnected. In some examples, operation 308 can be implemented in a similar manner as operation 216 of FIG. 2. After operation 310, process flow 300 moves to operation 312.

Operation 312 depicts dropping connection, and starting a disconnection timer for the connection. In some examples, operation 308 can be implemented in a similar manner as operation 218 of FIG. 2. After operation 312, process flow 300 ends.

Figure 4:
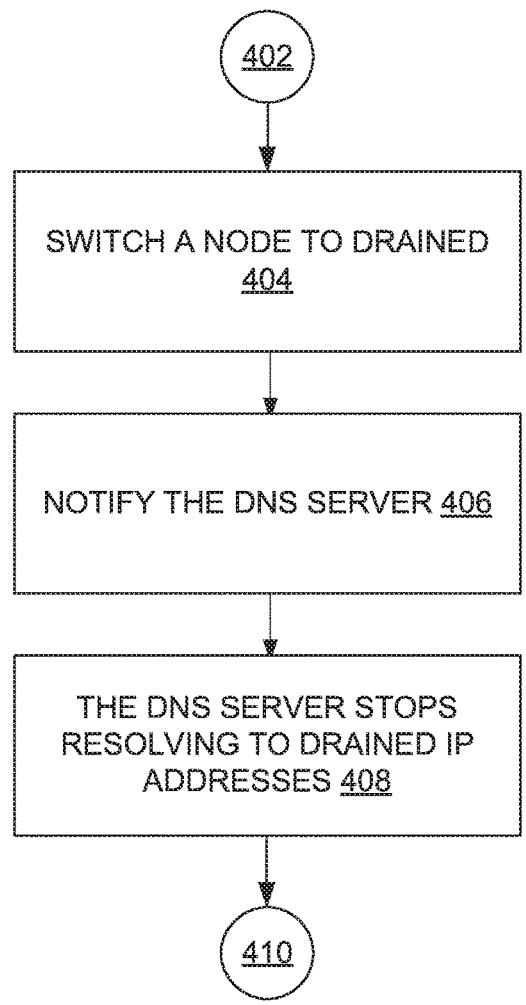
FIG. 4 illustrates an example process flow for ending client caching to facilitate passive management of network connections, in accordance with certain embodiments of this disclosure.

FIG. 4 illustrates an example process flow 400 for halting new connections to a drained node to facilitate passive management of network connections, in accordance with certain embodiments of this disclosure. In some examples, process flow 400 can be implemented at the start of a node moving to a drained state. A first step can involve ensuring that a DNS service does not assign new client connections to the node, and then the node can migrate existing client connections until it has no more client connections, so can be taken offline without disrupting any client connection.

In some examples, aspects of process flow 400 can be implemented by passive connection management node 1 108a of FIG. 1 as it communicates with one or more of client computer 1 102a, client computer 2 102b, or client computer 3 102c, as well as DNS server 116. In some examples, aspects of process flow 400 can be implemented by computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 400 begins with 402, and moves to operation 404. Operation 404 depicts a node switching to drained. This can occur when a node determines that it has maintenance to be performed. In other examples, a node can switch to drained in response to administrator input. A node switching to drained can comprise a node notifying a DNS server not to resolve domain name requests with IP addresses of the node, and attempting to migrate its current client connections to other nodes of a computing cluster. A purpose for a node draining can be to go offline to perform maintenance once it has no active client connections. After operation 404, process flow 400 moves to operation 406.

Operation 406 depicts notifying a DNS server. In an example, both a drained node and a DNS server can be nodes of storage cluster 106 of FIG. 1. Storage cluster 106 can implement a notification service between nodes. The DNS server can subscribe to notifications about nodes switching to drained, and the node can send such a notification through the service, which is received by the DNS server. After operation 406, process flow 400 moves to operation 408.

Operation 408 depicts the DNS server stopping resolving to drained IP addresses. That is, the DNS server can maintain a plurality of IP addresses for storage cluster 106. These IP addresses can correspond to different nodes of storage cluster 106. When a client provides the DNS server with a domain name for the storage cluster, the DNS server can select one of these IP addresses (for a node) and return it to the client. The client can then connect to the storage cluster by using the IP address to connect to the particular node of the cluster. In this manner, the DNS server can implement load balancing, by balancing client connections among the nodes of the storage cluster.

In such examples, operation 408 can comprise the DNS server removing the IP addresses for the drained node (which can be referred to as the drained IP addresses) from the plurality of IP addresses that it will respond to client requests with. After operation 408, process flow 400 moves to 410, where process flow 400 ends.

Figure 5:
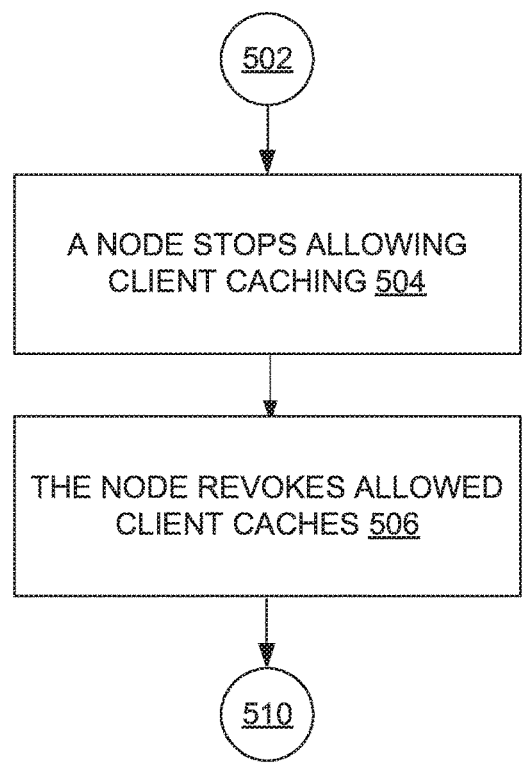
FIG. 5 illustrates an example process flow for halting new connections to a drained node to facilitate passive management of network connections, in accordance with certain embodiments of this disclosure.

FIG. 5 illustrates an example process flow 500 for ending client caching to facilitate passive management of network connections, in accordance with certain embodiments of this disclosure. In some examples, clients can cache resources from a cluster, such as a file, and modify it locally, without reporting each modification back to the cluster. A node that is draining can require clients to return cached resources before it begins to migrate active connections to other nodes of the cluster.

In some examples, aspects of process flow 500 can be implemented by passive connection management node 1 108a of FIG. 1 as it communicates with one or more of client computer 1 102a, client computer 2 102b, or client computer 3 102c, as well as DNS server 116. In some examples, aspects of process flow 500 can be implemented by computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 500 begins with 502, and moves to operation 504. Operation 504 depicts a node stopping allowing client caching. This can comprise a node refusing all new requests from connected clients to establish a new cache. After operation 504, process flow 500 moves to operation 506.

Operation 506 depicts the node revoking allowed client caches. In some examples, operation 504 to deny new caching requests can be implemented before operation 506, so that a client that has its cache revoked in operation 506 does not immediately reacquire that cache through a new request.

In some examples, there is a mechanism for a node to revoke a client cache where another client wants access to the cached resource. This mechanism can comprise the node sending a corresponding communication to the client. This mechanism can be implemented in operation 506 to revoke an allowed client cache, even though there is not another client that wants access to the cached resource, as can be indicated by the mechanism.

After operation 506, process flow 500 moves to 508 where process flow 500 ends.

Figure 6:
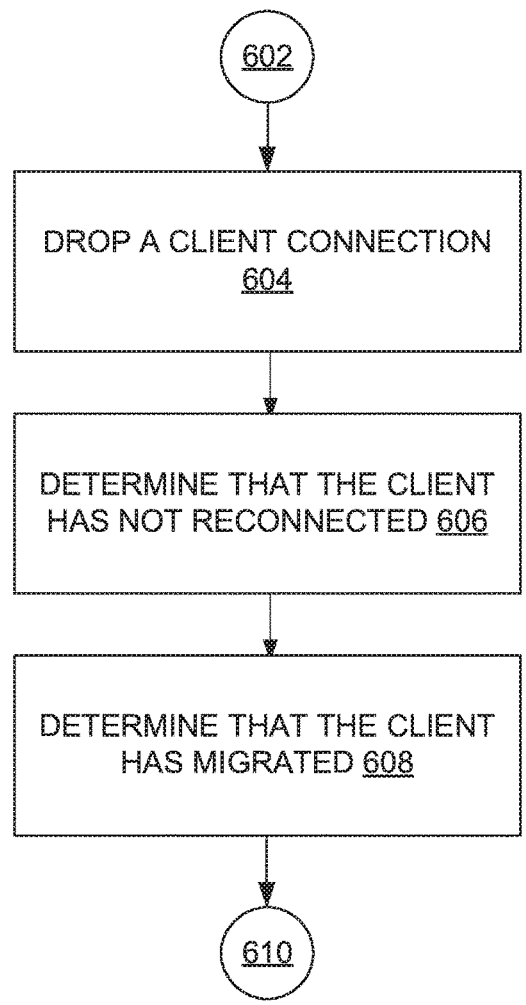
FIG. 6 illustrates an example process flow for migrating away always resolving clients to facilitate passive management of network connections, in accordance with certain embodiments of this disclosure.

FIG. 6 illustrates an example process flow 600 for migrating away always resolving clients to facilitate passive management of network connections, in accordance with certain embodiments of this disclosure. In some examples, stopping to provide drained IP addresses to new client connections and stopping client caching (as in FIGS. 4-5) can be a prelude to disconnecting active client connections. A client can have various implementations, such as always resolving, cache resolving, and resolve once, and the node might not be aware of what implementation a particular client has. In process flow 600, clients that turn out to implement always resolving can be migrated.

In some examples, aspects of process flow 600 can be implemented by passive connection management node 1 108a of FIG. 1 as it communicates with one or more of client computer 1 102a, client computer 2 102b, or client computer 3 102c, as well as DNS server 116. In some examples, aspects of process flow 600 can be implemented by computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604. Operation 604 depicts dropping a client connection. In some examples, dropping a client connection can be performed unilaterally by the node. This can be referred to as disconnecting the client. In some examples, the node can send a communication to the client via the connection that the client connection is being dropped by the node. After operation 604, process flow 600 moves to operation 606.

Operation 606 depicts determining that the client has not reconnected. In some examples, a reconnection timer can be instantiated in operation 604. Where the reconnection timer expires without the client having reconnected, then it can be determined in operation 606 that the client has not reconnected. After operation 606, process flow 600 moves to operation 608.

Operation 608 depicts determining that the client has migrated. That is, where the node disconnects the client, and the client does not reconnect to the node within a specified amount of time, the node can determine that the client has an always resolving implementation. An always resolving client will, upon being disconnected from the node, contact the corresponding DNS server with the domain name for the node's cluster—the always resolving client will always resolve the domain name for the cluster when it connects to the cluster.

Since the DNS server can be configured not to resolve a domain name for the cluster with an IP address for the node (e.g., as in process flow 300 of FIG. 3), the DNS server can respond to the client with an IP address for a different node of the cluster. The client will connect to this different node of the cluster, and thus be migrated away from the node.

After operation 608, process flow 600 moves to 610, where process flow 600 ends.

Figure 7:
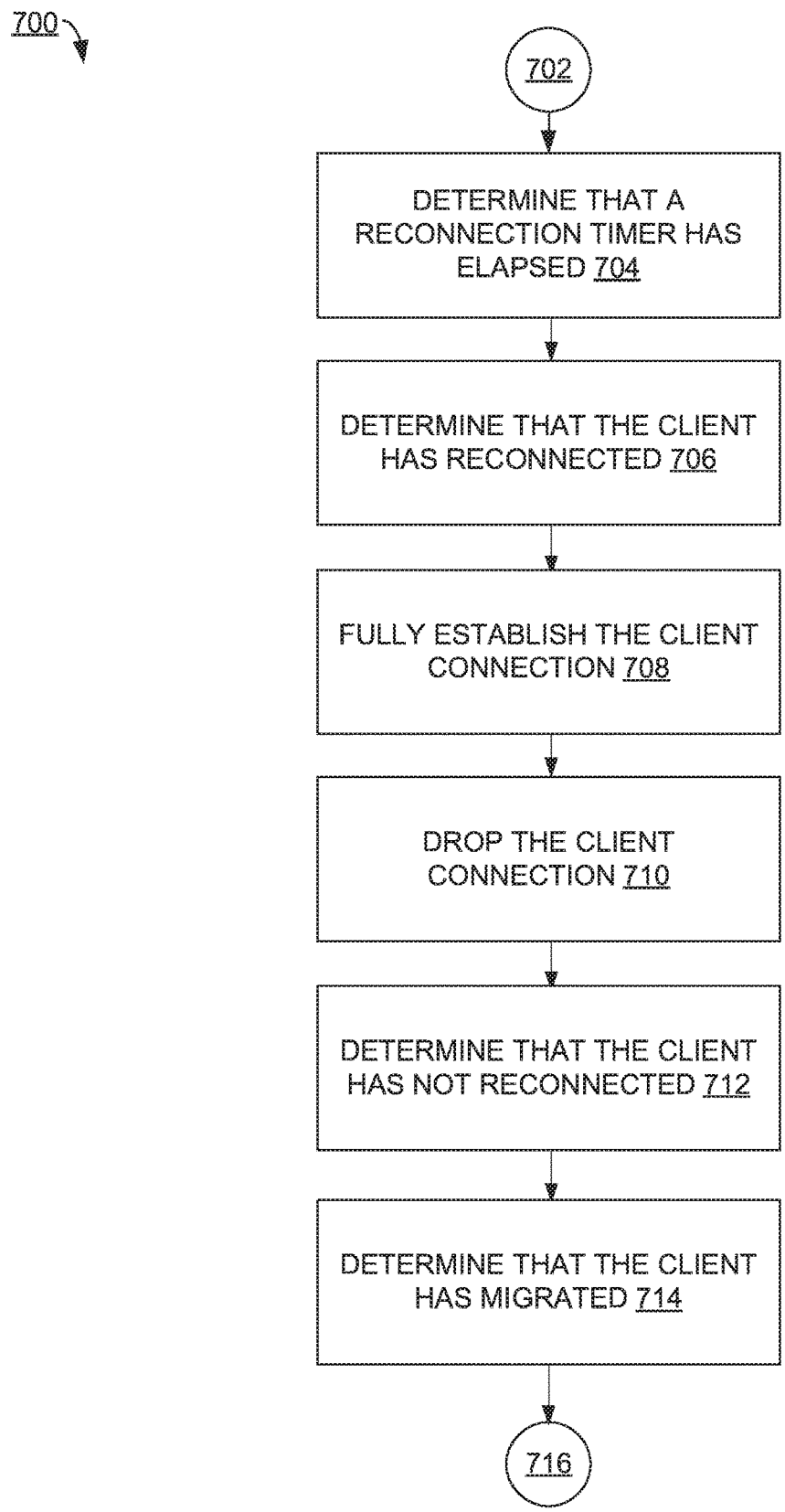
FIG. 7 illustrates an example process flow for migrating away cache resolving clients to facilitate passive management of network connections, in accordance with certain embodiments of this disclosure.

FIG. 7 illustrates an example process flow 700 for migrating away cache resolving clients to facilitate passive management of network connections, in accordance with certain embodiments of this disclosure. In some examples, a node can first disconnect its clients. Those clients that do not reconnect can be considered to be always resolving clients that have migrated. The remaining clients can be considered to be either cache resolving clients and/or resolve once clients. In process flow 700, those clients that turn out to be cache resolving clients can be migrated to another node of the cluster.

In some examples, aspects of process flow 700 can be implemented by passive connection management node 1 108a of FIG. 1 as it communicates with one or more of client computer 1 102a, client computer 2 102b, or client computer 3 102c, as well as DNS server 116. In some examples, aspects of process flow 700 can be implemented by computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704. Operation 704 depicts determining that a reconnection timer has elapsed. A reconnection timer can be instantiated by the node when a client reconnects. This reconnection timer can measure enough time for the client to fully reconnect. In some client implementations, the client can non-disruptively reconnect to a cluster where it has state information from fully connecting, and possibly accessing a resource of the cluster. This reconnection timer can permit the client enough time to accomplish this. After operation 704, process flow 700 moves to operation 706.

Operation 706 depicts determining that the client has reconnected. In some examples, operation 706 can be implemented in a similar, though inversed, manner as operation 606 of FIG. 6 but where the client reconnects within a specified amount of time. The node can maintain a list of identifiers (e.g., GUIDs) of clients that it disconnected. Where the identifier of the client newly connecting matches one of these stored GUIDs, then the node can determine that the client is reconnecting.

After operation 706, process flow 700 moves to operation 708.

Operation 708 depicts fully establishing the client connection. Fully establishing a client connection can comprise authenticating the client and reaching a point in the connection process where the client can then access a resource provided by the cluster, such as a storage service. After operation 708, process flow 700 moves to operation 710.

Operation 710 depicts dropping the client connection. In some examples, operation 710 can be implemented in a similar manner as operation 604 of FIG. 6. After operation 710, process flow 700 moves to operation 712.

Operation 712 depicts determining that the client has not reconnected. In some examples, operation 712 can be implemented in a similar manner as operation 606 of FIG. 6. After operation 712, process flow 700 moves to operation 714.

Operation 714 depicts determining that the client has migrated. In some examples, operation 714 can be implemented in a similar manner as operation 608 of FIG. 6. After operation 714, process flow 700 moves to 716, where process flow 700 ends.

Figure 8:
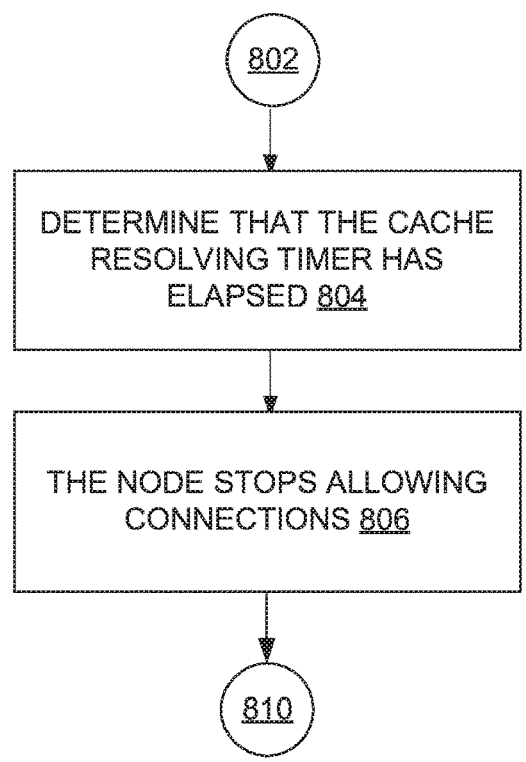
FIG. 8 illustrates an example process flow for migrating away resolve once clients to facilitate passive management of network connections, in accordance with certain embodiments of this disclosure.

FIG. 8 illustrates an example process flow 800 for migrating away resolve once clients to facilitate passive management of network connections, in accordance with certain embodiments of this disclosure. After migrating away resolve always clients with the operating procedures of FIG. 6, and migrating away cache resolving clients with the operating procedures of FIG. 7, a node can conclude that any remaining clients that connect to it are resolve once clients, and handle them accordingly with process flow 800.

In some examples, aspects of process flow 800 can be implemented by passive connection management node 1 108a of FIG. 1 as it communicates with one or more of client computer 1 102a, client computer 2 102b, or client computer 3 102c, as well as DNS server 116. In some examples, aspects of process flow 800 can be implemented by computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804. Operation 804 depicts determining that the cache resolving timer has elapsed. In some examples, operation 804 can be implemented in a similar manner as operation 710 of FIG. 7, but where a cache resolving timer has elapsed, as opposed to has not elapsed in operation 710. After operation 804, process flow 800 moves to operation 808.

Operation 806 depicts the node stopping allowing connections. This can comprise the node stopping new connections at a transport layer of a network communications layer, as opposed to at a communication protocol (e.g., SMB2) layer that can operate on top of a transport layer. By stopping allowing connections, it can be that even a resolve once client will eventually go back to the DNS server to resolve the cluster's domain name, and be directed to another node of the cluster that the client will connect to, thus migrating the client away from the node.

After operation 806, process flow 800 moves to 808, where process flow 800 ends.

Figure 9:
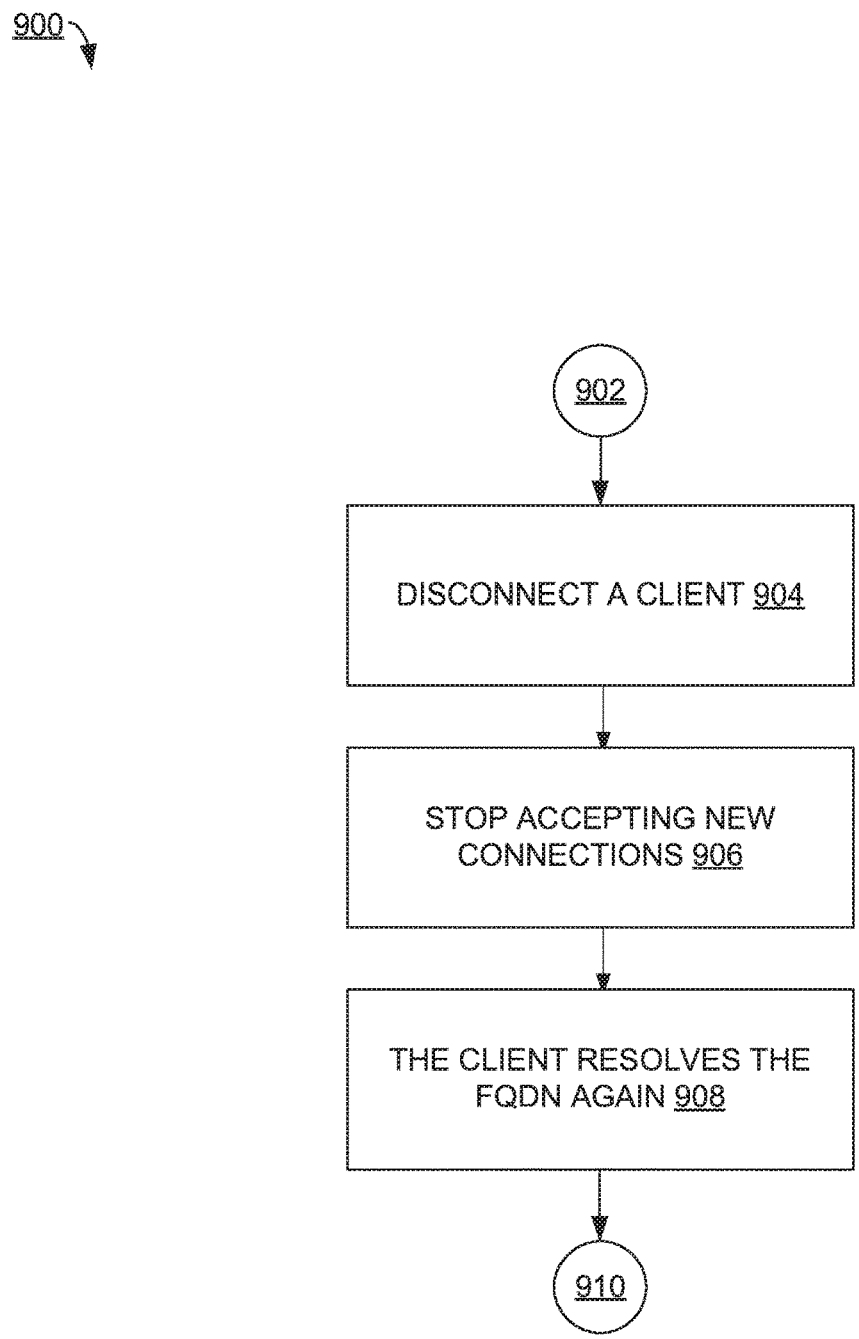
FIG. 9 illustrates another example process flow for migrating away resolve once clients to facilitate passive management of network connections, in accordance with certain embodiments of this disclosure.

FIG. 9 illustrates another example process flow 900 for migrating away resolve once clients to facilitate passive management of network connections, in accordance with certain embodiments of this disclosure.

In some examples, aspects of process flow 900 can be implemented by passive connection management node 1 108a of FIG. 1 as it communicates with one or more of client computer 1 102a, client computer 2 102b, or client computer 3 102c, as well as DNS server 116. In some examples, aspects of process flow 900 can be implemented by computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904. Operation 904 depicts disconnecting a client. This can be a client that the node has determined is a resolve once client, and will keep reconnecting without stronger intervention. After operation 904, process flow 900 moves to operation 906.

Operation 906 depicts stopping accepting new connections. This can comprise the node stopping accepting new connections at a transport layer of network communications layers, as opposed to at a communications protocol (e.g., SMB2) layer that the client-node connection operates at. After operation 906, process flow 900 moves to operation 908.

Operation 908 depicts the client resolving the domain name again. In some examples, where the node stops accepting connections at the transport layer, even a resolve once client will eventually go back to the DNS server to resolve the domain name of the cluster to a new IP address. With this new IP address to a different node, the client can connect to this different node, thus migrating away from the node. After operation 908, process flow 900 moves to 910, where process flow 900 ends.

Figure 10:
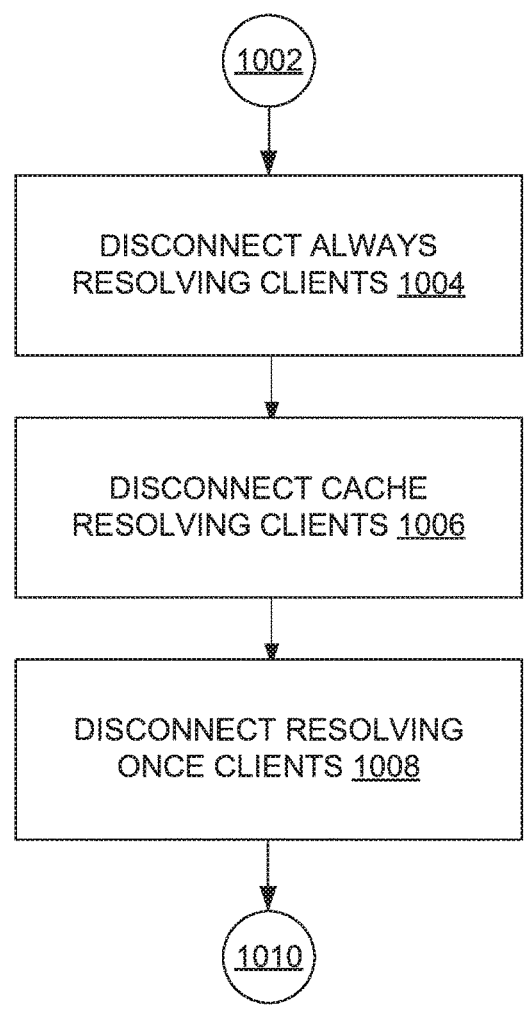
FIG. 10 illustrates an example process flow for migrating away clients based on their implementation to facilitate passive management of network connections, in accordance with certain embodiments of this disclosure.

FIG. 10 illustrates an example process flow 1000 for migrating away clients based on their implementation to facilitate passive management of network connections, in accordance with certain embodiments of this disclosure. Process flow 1000 can show an example order in which clients are migrated—always resolving clients, then cache resolving clients, then resolve once clients.

In some examples, aspects of process flow 1000 can be implemented by passive connection management node 1 108a of FIG. 1 as it communicates with one or more of client computer 1 102a, client computer 2 102b, or client computer 3 102c, as well as DNS server 116. In some examples, aspects of process flow 1000 can be implemented by computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004. Operation 1004 depicts disconnecting always resolving clients. This can comprise implementing process flow 600 of FIG. 6. In some examples, the node has not determined what type of implementation each client has, so can treat them all the same, to see which ones behave like always resolving clients. After operation 1004, process flow 1000 moves to operation 1006.

Operation 1006 depicts disconnecting cache resolving clients. The clients processed with operation 1006 can be those clients not determined to be always resolving clients in operation 1004. In some examples, operation 1006 can be implemented with process flow 700 of FIG. 7. In some examples, the node has not determined whether these clients are cache resolving clients or resolve once clients, so can treat them all the same, and see which clients behave like cache resolving clients. After operation 1006, process flow 1000 moves to operation 1008.

Operation 1008 depicts disconnecting resolve once clients. In some examples, operation 1008 can be implemented with process flow 800 of FIG. 8 and/or process flow 900 of FIG. 9. A node can determine that all clients that reach operation 1008 are resolve once clients, and treat them accordingly. After operation 1008, process flow 1000 moves to 1010, where process flow 1000 ends.

Figure 11:
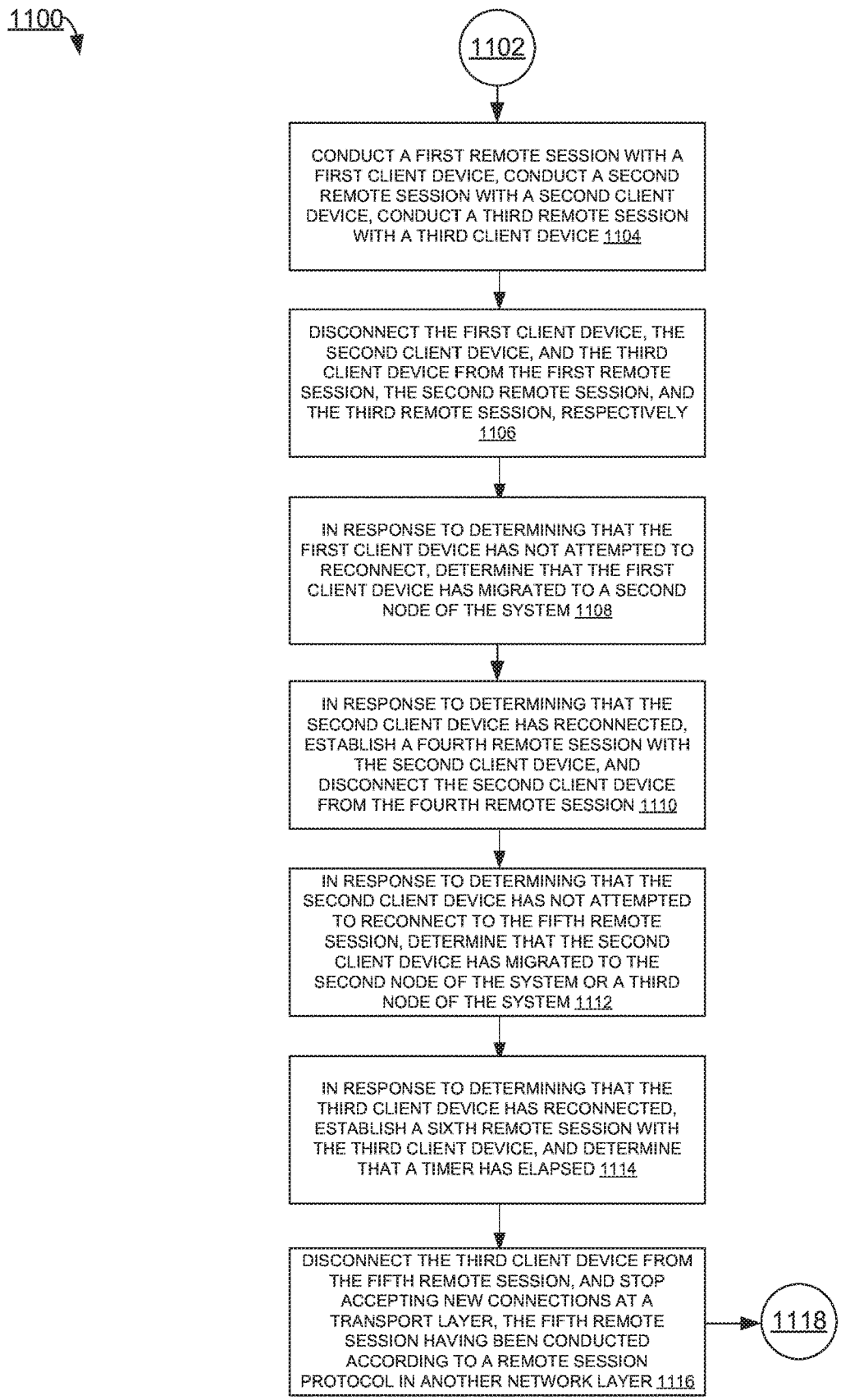
FIG. 11 illustrates an example process flow for passive management of network connections, in accordance with certain embodiments of this disclosure.

FIG. 11 illustrates an example process flow 1100 for passive management of network connections, in accordance with certain embodiments of this disclosure.

In some examples, aspects of process flow 1100 can be implemented by passive connection management node 1 108a of FIG. 1 as it communicates with one or more of client computer 1 102a, client computer 2 102b, or client computer 3 102c, as well as DNS server 116. In some examples, aspects of process flow 1000 can be implemented by computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 1100 begins with 1102, and moves to operation 1104. Operation 1104 depicts conducting a first remote session with a first client device, conducting a second remote session with a second client device, and conducting a third remote session with a third client device. In some examples, aspects of process flow 1100 can be implemented by passive connection management node 1 108a of FIG. 1, as it communicates with client computer 112a (which can be the first client device), client computer 112b (which can be the second client device), and client computer 112c (which can be the third client device). In some examples, operation 1104 comprises conducting, by a first node, a first remote session with a first client device, according to a remote communications protocol.

After operation 1104, process flow 1100 moves to operation 1106.

Operation 1106 depicts disconnecting the first client device, the second client device, and the third client device from the first remote session, the second remote session, and the third remote session, respectively. In some examples, operation 1106 can be implemented in a similar manner as operation 218 of FIG. 2.

In some examples, a DNS service of the system stops resolving a domain name of the system to an Internet Protocol address of the first node before performing the disconnecting of the first client device, the second client device, and the third client device. This can be implemented in a similar manner as operation 202 of FIG. 2. In some examples, the DNS service of the system stops resolving the domain name of the system to the IP address in response to receiving a communication from the first node indicative of the first node beginning to enter a drained state. That is, the DNS service stops resolving to the first node's IP addresses because it has been informed by the first node to do so.

In some examples, the first node stops allowing new client caching requests before performing the disconnection of the first client device, the second client device, and the third client device from the first remote session, the second remote session, and the third remote session, respectively. That is, the first node can allow clients to cache resources of a cluster, e.g., via an oplock or lease. Where part of migrating connections away from the first node includes the first node not allowing any active permissions for client caches, the first node can stop issuing new client caching permissions.

In some examples, the first node revokes an existing client caching permission before performing the disconnecting of the first client device, the second client device, and the third client device from the first remote session, the second remote session, and the third remote session, respectively. That is, in addition to denying new client caching permissions, the first node can revoke any existing client caching permissions.

In some examples, the computing node revokes the existing client caching permission by sending a network communication to a client device that possesses the existing client caching permission, indicating that another client device has requested access to a resource of the system that corresponds to the existing client caching permission, and waits until either the client device confirms that it has performed a cache flush that corresponds to the existing client permission or that a predetermined amount of time has elapsed since performing the sending of the network communication. That is, the first node can wait until the client affirmatively gives up its client cache, or the first node can wait for a cache timer to expire, and after that proceed as if the client has given up its client cache.

In some examples, the first node stops allowing new client caching requests before the first node performs the revoking of the existing client caching permission. This can be implemented so that a client that has its caching permission revoked does not immediately acquire a new caching permission.

In some examples, operation 1106 comprises determining that the client device has returned a resource of the system that the client has cached locally as part of the first remote session before performing the disconnecting of the first remote session.

In some examples, operation 1106 comprises disconnecting, by the first node, the first remote session. In some examples, operation 1106 comprises disconnecting a first remote session that is being conducted between a first node of the system and a client device.

After operation 1106, process flow 1100 moves to operation 1108.

Operation 1108 depicts, in response to determining that the first client device has not attempted to reconnect, determining that the first client device has migrated to a second node of the system. In some examples, operation 1108 can be implemented in a similar manner as operations 218, 222 and 224 of FIG. 2, where it is determined that the first client device has a resolve always implementation.

After operation 1108, process flow 1100 moves to operation 1110.

Operation 1110 depicts, in response to determining that the second client device has reconnected, establishing a fourth remote session with the second client device, and disconnecting the second client device from the fourth remote session. In some examples, operation 1110 can be implemented in a similar manner as the flow of operations 218, 220, 222, 232 and 234 of FIG. 2. In some examples, establishing the fourth remote session can comprise establishing the fourth remote session to a state where the client device can access resources of the system, before performing the disconnecting of the second remote session. In some examples, establishing the fourth remote session comprises permitting the second client device to access a file of the system via the fourth remote session before performing the disconnecting of the fourth remote session.

In some examples, determining that the second client device has reconnected can be performed as follows. In some examples, a client device can be identified as a participant in a remote session via an identifier (such as a GUID) that the client device provides as part of establishing the remote session. Where this same identifier is provided as part of establishing a new remote session, then the node can determine that it is the original client reconnecting. Where a previously-unseen identifier is provided as part of establishing a new remote session, the node can determine that the original client is not the new participant.

After operation 1110, process flow 1100 moves to operation 1112.

Operation 1112 depicts, in response to determining that the second client device has not attempted to reconnect to the fifth remote session, determining that the second client device has migrated to the second node of the system or a third node of the system. In some examples, operation 1112 can be implemented in a similar manner as operations 228 and 230 of FIG. 2, where it is determined that the second client device is a cache resolving client.

After operation 1112, process flow 1100 moves to operation 1114.

Operation 1114 depicts, in response to determining that the third client device has reconnected, establishing a sixth remote session with the third client device, and determining that a timer has elapsed. In some examples, operation 1114 can be implemented in a similar manner as operations 222 and 236 of FIG. 2, where it is determined in operation 236 that the cache resolving timer has elapsed. In some examples, a value (or amount of time) of the timer to count can be specified by an administrator of the node.

In some examples, the timer counts to first period of time before elapsing, the first period of time being greater than a second period of time at which a second client device that implements a cache resolving policy clears a cache entry comprising a domain name and a corresponding IP address of the first node. That is, a cache resolving timer can be set so that it is longer than an amount of time that a cache resolving clients keeps its domain name/IP address caches alive for. That way, at the expiration of a cache resolving timer, a node can determine that a client would have already migrated away if it was a cache resolving client.

In some examples, operation 1114 comprises, in response to a request from a client to reconnect, establishing, by the first node, another remote session with the client device. In some examples, operation 1114 comprises, in response to a request from a client to reconnect, establishing a new remote session between the first node and the client.

After operation 1114, process flow 1100 moves to operation 1116.

Operation 1116 depicts disconnecting the third client device from the sixth remote session, and stopping accepting new connections at a transport layer, the sixth remote session having been conducted according to a remote session protocol in another network layer. In some examples, operation 1116 comprises, in response to determining that the timer has elapsed, disconnecting the third client device from the sixth remote session, and stopping accepting new connections at a network transport layer, the fifth remote session having been conducted according to a remote session protocol that is in a network layer above the network transport layer.

In some examples, operation 1116 can be implemented in a similar manner as operation 228 and 240 of FIG. 2, where it is determined that the third client device is a resolve once client.

In some examples, operation 1116 comprises performing maintenance on the first node after the first node has no connected remote sessions. That is, a purpose of migrating client connections away from the first node can be to perform maintenance on the first node, and this maintenance can be performed after migration is completed. In some examples, this maintenance comprises upgrading an executable program of the first node, such as an operating system of the first node.

In some examples, operation 1116 comprises accepting new remote sessions by the first node after completing the performing of the maintenance. That is, once the maintenance is complete, the first node can return to a state of providing remote connection sessions with client devices.

In some examples, operation 1116 comprises the first node indicating to DNS service that the DNS service can respond to a request with an internet protocol address or addresses that corresponds to the first node. That is, a way that the first node can return to a state of providing remote connection sessions with client devices is to notify its DNS service that the DNS service can direct client devices to connect to the first node.

In some examples, the remote sessions are conducted according to SMB2 communications protocol that operates at a different network layer than the network transport layer.

In some examples, operation 1116 comprises, in response to determining that a cache resolving timer has elapsed since determining to perform the disconnecting of remote sessions, disconnecting, by the first node, the remote sessions, and stopping accepting connections at a network transport layer, the remote communications protocol operating on a network layer above the network transport layer. In some examples, operation 1116 comprises, in response to determining that a cache resolving timer has elapsed since determining to perform disconnecting of remote sessions, disconnecting the remote sessions, and stopping accepting connections to the first node at a network transport layer.

After operation 1116, process flow 1100 moves to 1118, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, aspects of computing environment 1200 can be used to implement aspects of client computer 1 102a, client computer 2 102b, storage cluster 106, passive connection management node 1 108a, passive connection management node 2 108b, passive connection management node 3 108c, and/or DNS server 126 of FIG. 1. In some examples, computing environment 1200 can implement aspects of the process flows of FIGS. 2-11 to facilitate passive management of network connections.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
conducting, by a first node of the system, a first remote session with a first client device;
conducting, by the first node, a second remote session with a second client device;
conducting, by the first node, a third remote session with a third client device;
disconnecting, by the first node, the first client device, the second client device, and the third client device from the first remote session, the second remote session, and the third remote session, respectively;
in response to determining to disconnect the third client device, starting, by the first node, a cache resolving timer that measures an amount of time that connections have to migrate to another node before the first node stops accepting new connections at a network transport layer;
in response to determining that the first client device has not attempted to reconnect, determining, by the first node, that the first client device has migrated to a second node of the system;
in response to determining that the second client device has reconnected, establishing, by the first node, a fourth remote session with the second client device, and disconnecting, by the first node, the second client device from the fourth remote session;
in response to determining that the second client device has not attempted to reconnect to the fourth remote session, determining, by the first node, that the second client device has migrated to the second node of the system or a third node of the system;

in response to determining that the third client device has reconnected, establishing, by the first node, a fifth remote session with the third client device, and determining, by the first node, that the cache resolving timer has elapsed; and in response to determining that the cache resolving timer has elapsed, disconnecting, by the first node, the third client device from the fifth remote session, and stopping, by the first node, accepting new connections at the network transport layer, the fifth remote session having been conducted according to a remote session protocol that is in a network layer above the network transport layer.

2. The system of claim 1, wherein a domain name system (DNS) service of the system stops resolving a domain name of the system to an Internet Protocol address of the first node before performing the disconnecting of the first client device, the second client device, and the third client device, and wherein the DNS service continues to resolve the domain name to a fourth client device.

3. The system of claim 2, wherein the DNS service of the system stops resolving the domain name of the system to the Internet Protocol address in response to receiving a communication from the first node indicative of the first node beginning to enter a drained state.

4. The system of claim 1, wherein the first node stops allowing new client caching requests before performing the disconnecting of the first client device, the second client device, and the third client device from the first remote session, the second remote session, and the third remote session, respectively.

5. The system of claim 1, wherein the first node revokes an existing client caching permission that permits the first client device to locally store a first copy of a first file while locking a second copy of the first file on the system before performing the disconnecting of the first client device, the second client device, and the third client device from the first remote session, the second remote session, and the third remote session, respectively.

6. The system of claim 5, wherein the computing node revokes the existing client caching permission by sending a network communication indicating that another client device has requested access to a resource of the system that corresponds to the existing client caching permission to a client device that possesses the existing client caching permission, and waits until the client device confirms that it has performed a cache flush that corresponds to the existing client permission.

7. The system of claim 5, wherein the first node stops allowing new client caching requests before the first node performs the revoking of the existing client caching permission.

8. A method, comprising:
conducting, by a first node of a system comprising a processor, a first remote session with a first client device, according to a remote communications protocol;

disconnecting, by the first node, the first remote session;

in response to a request from the first client device to reconnect, establishing, by the first node, a second remote session with the first client device; and in response to determining that a predetermined amount of time has passed since determining to perform the disconnecting of the first remote session, disconnecting, by the first node, the second remote session, and stopping accepting connections at a network transport layer, the remote communications protocol operating on a network layer above the network transport layer.

9. The method of claim 8, further comprising:
establishing, by the first node, the second remote session to a state where the client device can access resources of the system; and in response to performing the establishing of the second remote session to the state where the client device can access resources of the system, performing the disconnecting of the second remote session.

10. The method of claim 8, further comprising:
in response to determining, by the first node, that the client device has accessed a file of the system via the second remote session, performing the disconnecting of the second remote session.

11. The method of claim 8, wherein the first node identifies the first client device as a first participant in the first remote session via the first client device providing a first identifier when establishing the first remote session, wherein the first node identifies the first client device as a second participant in the second remote session where the second participant provides the first identifier to the first node, and wherein the first node identifies that the first client is not the second participant where the second participant provides a second identifier to the first node, the second identifier differing from the first identifier, wherein the first identifier and the second identifier each comprising a globally unique identifier or a universally unique identifier.

12. The method of claim 8, further comprising:
determining, by the first node, that the first client device has returned a first copy of a file of the system that the client has cached locally as part of the first remote session before performing the disconnecting of the first remote session, wherein the first copy of the file differs from a second copy of the file maintained by the system, and wherein the system overwrites the second copy of the file with the first copy of the file.

13. The method of claim 8, wherein the predetermined amount of time is a first predetermined amount of time, wherein the first predetermined amount of time is greater than a second predetermined amount of time at which a second client device that implements a cache resolving policy clears a cache entry comprising a uniform resource locator and a corresponding internet protocol address of the first node.

14. The method of claim 8, wherein a time value of the timer is specified by an administrator.

15. A non-transitory computer-readable medium comprising instructions that, in response to execution, cause a system comprising a processor to perform operations, comprising:
disconnecting a first remote session that is being conducted between a first node of the system and a client device;

in response to a request from the first client to reconnect, establishing a second remote session between the first node and the client device; and in response to determining that a timer has elapsed since determining to perform the disconnecting of the first remote session that measures a permissible amount of time to permit a cache resolving client device to migrate to another node of the system, disconnecting the second remote session, and stopping accepting connections to the first node at a network transport layer.

16. The non-transitory computer-readable medium of claim 15, wherein the operations further comprise:

performing maintenance on the first node after the first node has no connected remote sessions.

17. The non-transitory computer-readable medium of claim 16, wherein the performing of the maintenance comprises:
upgrading an executable program of the first node.

18. The non-transitory computer-readable medium of claim 16, wherein the operations further comprise:
accepting new remote sessions by the first node after completing the performing of the maintenance.

19. The non-transitory computer-readable medium of claim 18, wherein the accepting of new remote sessions comprises:
the first node indicating to a domain name system service that the domain name system service can respond to a request with an internet protocol address that corresponds to the first node.

20. The non-transitory computer-readable medium of claim 15, wherein the first remote session and the second remote session are each conducted according a server message block version 2 communications protocol that operates at a different network layer than the network transport layer.

* * * * *